MICROWAVE ZIG-ZAG LINE COUPLERS

Filed March 9. 1961 2 Sheets-Sheet 1

INVENTORS
CLARENCE D. LUNDEN
LUIS L. OH
BY
Reynolds & Christensen
ATTORNEYS

Jan. 26, 1965 C. D. LUNDEN ETAL 3,167,727
MICROWAVE ZIG-ZAG LINE COUPLERS
Filed March 9. 1961 2 Sheets-Sheet 2
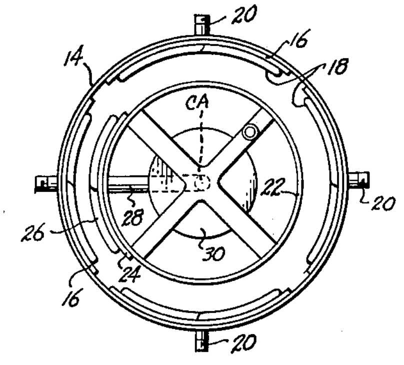
Fig. 5.
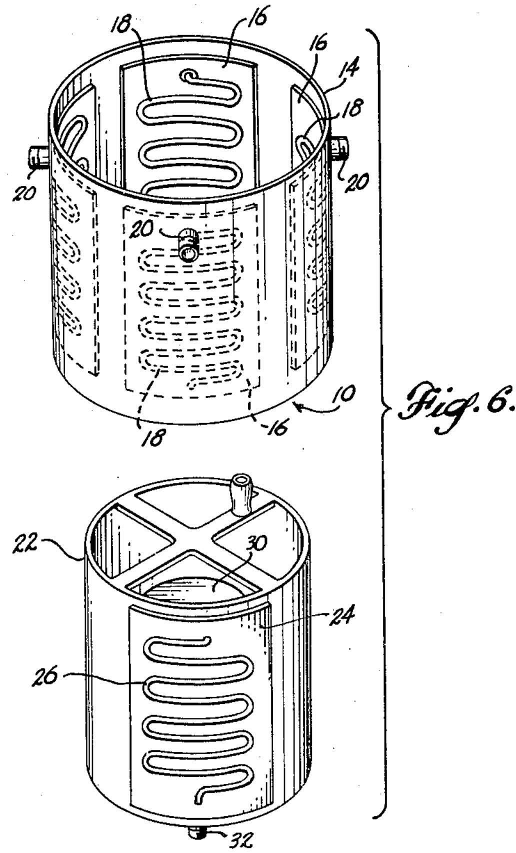
Fig. 6.
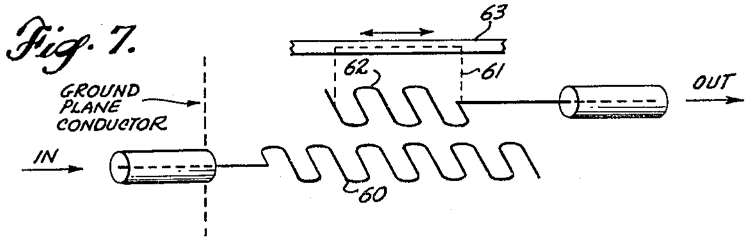
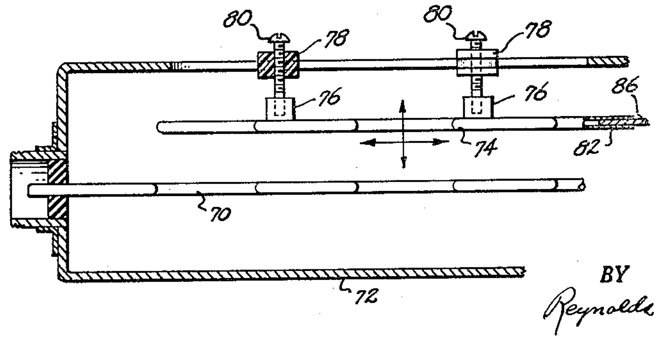
Fig. 8.
INVENTORS
CLARENCE D. LUNDEN
LUIS L. OH
BY
Reynolds & Christensen
ATTORNEYS United States Patent Office 3,167,727
Patented Jan. 26, 1965

3,167,727
MICROWAVE ZIG-ZAG LINE COUPLERS

Clarence D. Lunden, Tacoma, and Luis L. Oh, Seattle, Wash., assignors to Boeing Airplane Company, Seattle, Wash., a corporation of Delaware Filed Mar. 9, 1961, Ser. No. 94,589
16 Claims. (Cl. 333—7)

This invention relates to microwave energy transmission systems embracing the frequency range above the high-frequency range, i.e., above a few megacycles per second, and more particularly concerns improvements in techniques for coupling energy from one line to another, including but not necessarily limited to applications to any of the following: coupling for the purpose of power transfer, coupling with a power dividing function, coupling with a switching function, coupling with a phase shifting function and related or similar applications. The invention is herein illustratively described by reference to its presently preferred embodiments; however, it will be recognized that certain modifications and changes therein with respect to details may be made and that certain other applications thereof may be developed within the scope of the novel features involved.

The present invention deals with a class of devices operable in the microwave range, such as in the VHF, UHF and SHF ranges, and is therefore to be distinguished from so-called commercial frequency power systems in the range of a few hundred cycles per second and less. In the latter type of system terminal equipment (i.e., as distinguished from long transmission lines) operates without reference to wavelength and relies entirely upon inductive and capacitive coupling or direct electrical contact for transferring energy from one system or conductor to another. In microwave systems, however, to which the present invention relates, the electrical dimensions of conductors and components in terms of wave lengths become important and distributed capacitance and inductance repsent the parameters of principal interest in determining the operating phenomena. For example, in this case, while the devices of the invention are fortunately not critical in the sense of requiring close mechanical tolerances in order to achieve workable and efficient systems, still the principles of operation are such that mere inductive coupling or mere capacitive coupling do not control nor explain design or operating requirements. An object of the present invention is to provide coupling systems and devices of the types mentioned above and others which are easily manufactured and operated without critical, costly precision parts or mounting arrangements.

Another important object is a versatile class of devices which are adapted for broad-band operation.

Still another object is to provide compact coupling devices of the kinds indicated which are in any given case adaptable to any of different operating frequencies throughout a wide range, so that certain parts may be made standard and of like form and size, yet adaptable or usable to satisfy the operating conditions in a number of different frequency bands. Previous types of coupling devices using coaxially arranged helices of different diameters lacked this degree of adaptability or flexibility inasmuch as spacing between the helically formed conductors was fixed by the relative diameters of the respective helices. In this invention, however, efficient power transfer between cooperating coupling conductors may be achieved at any of widely different frequencies merely by varying the spacing between such conductors.

A specific object is a power transfer device, whether for mere coupling, for switching, for power division, for phase shift, or for similar applications, which operates without appreciable energy loss, without danger of arcing as occurs between the contacts of a conventional switch or like device, without problems of mechanical wear or erosion of parts as in conventional equipment, and without undue limitation as to maximum operating voltage or maximum power transfer rate.

Still another object of the invention is to provide a novel multiposition switching device which presents a substantially constant impedance in its different switching positions and intermediate transitory positions.

Still another object is an improved broad-band phase shifting device having the general attributes mentioned above.

A further specific object is a novel power dividing device.

The devices comprising this invention are characterized by two or more elongated conductors of similar zig-zag configuration arranged in or movable into mutually spaced, generally parallel superposed relationship, and with one such conductor being connected in one side of an energy transfer system and with the other conductor in a second side of such a system. The width of the zig-zag configuration is preferably less than a quarter-wavelength at the operating frequency, whereas the length of the configuration is not critical but should comprise at least a few zig-zag pitch distances or undulation cycles. The zig-zag pitch distance itself also is not critical or limiting. Nevertheless, inasmuch as the superposed conductors are arranged with the peaks of one in registry with the valleys of the other with respect to longitudinal positioning therebetween, in order to effect maximum or complete energy transfer between the conductors, the pitch should not be so great in terms of the width of the zig-zag configuration that the connecting segments of conductor between the peaks and valleys of one conductor are approximately at right angles to the similar connecting segments of the other conductor; otherwise power transfer efficiency is impaired.

Ground plane housings, shields or auxiliary conductors may be provided with any of these new coupling devices, if desired, for purposes of lowering the transfer impedance thereof.

These and other features, objects and advantages of the invention will become more fully evident from the following description thereof by reference to the accompanying drawings.

FIGURE 5 is a top view of a four-position zig-zag line rotary switch or constant-impedance power divider embodying the invention; and FIGURE 6 is an exploded isometric view of the switch with the principal parts shown in mutually separated positions.

FIGURE 7 is a simplified drawing illustrating a step-by-step phase shifter embodying the invention.

FIGURE 8 is a sectional side view of a power coupler or switch with means to vary the spacing between the zig-zag conductors in order to obtain optimum transfer conditions at a given frequency.

Figure 1:
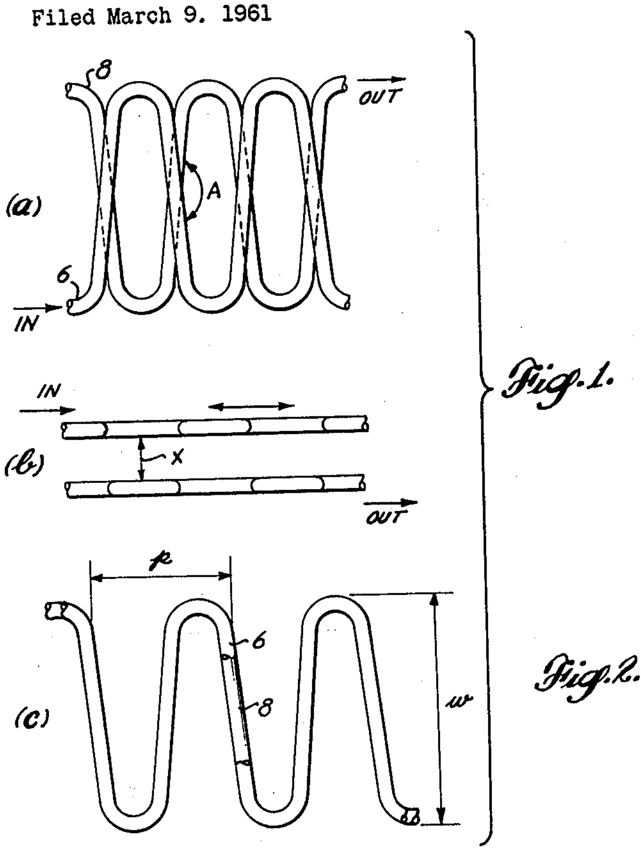
FIGURE 1 shows the respective conditions for maximum power transfer and minimum power transfer between the mutually superposed conductors in coupling devices embodying this invention.

Referring to FIGURE 1 the input zig-zag conductor 6 and output zig-zag conductor 8 are mounted by means not shown in superposed relationship with a spacing X therebetween. Preferably each of these conductors comprises one or more full undulation cycles of conductor and for optimum or maximum power transfer should comprise several such cycles or undulations. If too little length is employed, less than complete power transfer takes place between the conductor. When the optimum length is employed for a given spacing X between the conductors, virtually complete power transfer takes place efficiently. If the spacing is maintained constant and the length is greater than optimum, there is a reversal of the power transfer phenomenon due to destructive interference betwene the field patterns created by the operating modes of the two conductors, and less than complete power transfer takes place. However, it is possible, with a given length of the conductors (i.e., of the shorter conductor in case their lengths differ) to adjust for maximum power transfer conditions. Thus, the attainment of virtually complete power transfer depends both on having conductors of sufficient length and upon the spacing between the conductors, and it is possible by adjusting the spacing to compensate for a deficiency or an excess of length for a given operating frequency. However, there is a limit to the range through which spacing X may be increased in order to compensate for insufficient conductor length, since if the distance is too great energy is lost through space attenuation.

The other conditions of design, such as the pitch distance $p$ and the width of the zig-zag configuration $w$, are relatively uncritical. The pitch distance preferably should be a small fraction of the wavelength. Moreover, it is, of course, necessary that the cross-over angle A (FIGURE 1) of the superposed conductors in maximum coupling position be substantially greater than 90 degrees.

It is extremely difficult by analytical methods to define the precise conditions and parameters and the relationship of parameters which will define the energy transfer functions. By empirical methods, however, it is readily possible to establish design conditions for optimum transfer coefficient with minimum energy loss. In most applications, when the optimum conditions are established as by varying the spacing X to achieve maximum power transfer efficiency at a given frequency, the band-width of a device employing these mutually superposed zig-zag conductor coupling elements is large (i.e., of the order of 10 percent).

In qualitative terms, the coupling device depicted in this disclosure is a co-directional type device, that is, the energy enters at one end of one conductor and leaves through the other conductor at the opposite end of the latter. The principle of power transfer from one zig-zag line to another is that of spatial beating between the waves of coupled transmission lines. This phenomenon, of course, is different from the inductive coupling that occurs in an ordinary commercial power frequency transformer wherein the formation and collapse of magnetic field causes voltage induction in order to transfer energy between conductors. In a zig-zag line coupler represented by this invention, power is transferred from one line to another as a result of destructive and constructive interference between the two propagating modes associated with the distributed inductance and capacitance of the lines. The two lines placed close to each other, with one line a half-pitch ahead of or behind the other as shown in FIGURE 1A, support two characteristic field patterns corresponding to two independent modes of propagation. The fields in each are associated with both zig-zag lines. In the longitudinal mode, the currents in both lines are of the same sign, and in the transverse mode they are of opposite sign. In the case where waves travel in one direction only, only two waves are present, one for each mode. The corresponding velocities of the two waves are perturbed from the nominal or original velocity, one becoming slightly higher and the other slightly lower. Because of the difference in wavelengths of the two modes, the amplitude in each zig-zag line changes with axial distance. Because of the plus-minus and plus-minus forms of mode distribution in the zig-zag line couplers, at the point where the interacting waves are destructive on one zig-zag line they are constructive on the other. Thus, as the signal energy which is fed into one of the two zig-zag lines travels in the axial direction, it can be made to transfer gradually to the other zig-zag line until at some point very nearly all the power has been transferred. In the ideal case, where the two zig-zag lines have the same velocity of propagation, the correct coefficient of coupling, and the right position relative to each other, the energy transfer between zig-zag lines is complete and is periodic with distance. When the power is maximum on one line, it is zero on the other line. Complete power transfer takes place only when, at a given spacing between the lines, the lines are of a given length. If the lines are too short, the power transfer will be incomplete; if the lines are too long, the power flow will reverse, and a portion of the power in the output line will be transferred back to the input line. As previously mentioned, however, it is possible by adjustment of the spacing X to achieve virtually optimum power transfer conditions even though at a different spacing the length of the lines will be somewhat incorrect. This permits a given mechanical device to be adapted for any of different operating frequencies.

In FIGURE 1C the positioning of the zig-zag conductors in co-phased relationship is such that substantially no power transfer takes place between the conductors regardless of their lengths or any other condition.

Figure 2:
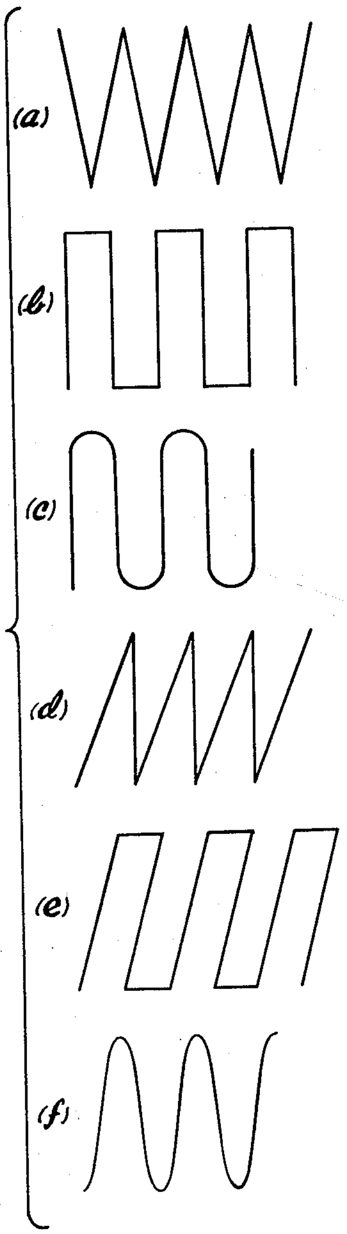
FIGURE 2 is a series of diagrams showing different possible conductor zig-zag configurations.

In the diagrams represented in the different parts of FIGURE 2 different zig-zag configurations are depicted which are alternatively usable in devices of the invention. These and still other configurations may be used in lieu of the approximately sinusoidal configurations depicted in FIGURE 1 and elsewhere herein.

It will be evident in FIGURES 1 and 2 that the same pitch distances or integral-multiple pitch distances are required in the respective conductors in order to achieve the necessary physical symmetry required for energy coupling or decoupling in the alternative relative positions of the conductors.

Figure 3:
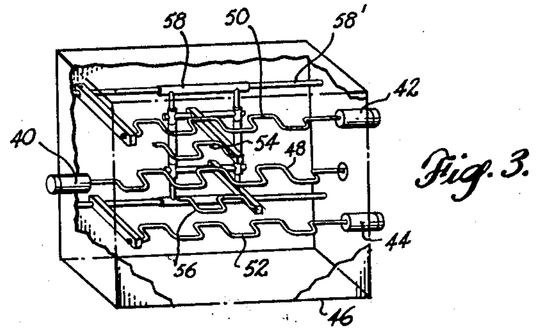
FIGURE 3 is an isometric view of a two-position zig-zag line switch of this invention, with parts broken away.
Figure 4:
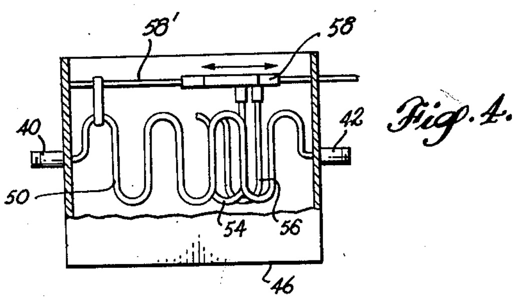
FIGURE 4 is a top view of the same switch, with parts broken away.

Referring to FIGURES 3 and 4, a two-position zig-zag line switch is illustrated, having a single input 40 and two alternately energized outputs 42 and 44. These coaxial line terminals are mounted on a conductive housing 46 which serves as a ground plane and encloses a group of zig-zag coupling lines. The line 48, connected to the central conductor of input line 40, is mounted at an intermediate position in the housing 46. Spaced from and mounted parallel to the zig-zag conductor 48 are the similar zig-zag conductors 50 and 52 connected respectively to the output conductors 42 and 44, and co-phased in position (longitudinally) with relation to each other and to the zig-zag conductor 48.

In co-phased position, as thus mounted in the housing 46, the relationship between the conductors 50, 48 and 52 is such, in the absence of additional apparatus, that no power transfer takes place. However, there is also provided in the mechanism two additional zig-zag conductors 54 and 56 mounted respectively in the spaces between conductors 48 and 50 and conductors 48 and 52, at intermediate positions and in parallel relationship to the latter. These conductors 54 and 56 are mounted on a sliding support 58 which is movable lengthwise of the conductors, with the conductor 54 displaced at 180 degrees from the conductor 56 in terms of longitudinal phase relationship. In one position of the slider 58 wherein one of its zig-zag conductors is 180 degrees out of phase or registry in relation to the adjoining two zig-zag conductors, maximum power transfer is caused to occur between the latter two conductors while no power transfer occurs between the other two conductors. However, shifting the slider 58 longitudinally by a half-pitch distance produces the reverse condition wherein all of the power transfers between the input conductor and the other of the two output conductors. In effect, therefore, this device constitutes a two-position switch which is actuated by moving the slider lengthwise of the slide rods 58' in order to vary the phase relationship between the pairs of stationary conductors 48, 50 and 48, 52 and the associated movable conductors 54 and 56, interposed between the members of the respective pairs.

Referring to FIGURES 5 and 6, the illustrated four-position rotary switch comprises the switch stator unit 10 and switch rotor unit 12 mounted coaxially within the stator to rotate on the common axis thereof, CA. The stator comprises a cylindrical metal drum or casing 14 upon the internal wall of which, in this instance, at quadrature-spaced locations distributed about its periphery are mounted the insulating spacer plates 16 which carry individual zig-zag conductors 18 extending lengthwise of the stator and conformed to the circular shape thereof in their respective body planes. An output coaxial line coupling 20 is connected to one end of each such zig-zag line conductor, the outer conductor of the coupling being grounded to the casing and the inner conductor thereof being connected to the upper end of the individual zig-zag conductors, respectively. The casing serves as a ground plane which helps lower the impedance of the device. The rotor comprises a hollow conductive cylindrical drum 22 smaller than the drum 14 and rotationally mounted coaxially within the latter by suitable means (not shown). This inner drum on its outside face carries an insulating support plate 24 upon which is mounted a zig-zag conductor 26 similar in configuration to the conductors 18. The lower end of this zig-zag conductor 26 is connected through a coaxial line 28 to a rotary joint 30 which couples such line to the input coaxial line 32 adapted to be fed with microwave energy from a suitable source (not shown). The inner drum also serves as a ground plane helping to lower the switch impedance to a convenient value.

The separate zig-zag conductor 26 extends lengthwise of the rotor and is longitudinally offset from the conductors 18, which are in registry with each other, so that the clockwisemost peaks or crests of the zig-zag conductor 26 are aligned with the spaces between the clockwisemost peaks or crests of the conductors 18, representing the condition of maximum power transfer between conductor 26 and any of the conductors 18 upon which it is superimposed at any instant. The pitch of the conductors 18 and 26 is the same. Also, it is preferred that the width of the zig-zag conductor configurations 18 be the same as that of conductor 26, although within limits it is not a critical necessity that the width be the same nor is it necessary that the conductors all be of the same length.

Preferably each of the elongated conductors 18 and 26 comprise at least a few cycles or undulations of zig-zag configuration.

When the switch rotor positions the zig-zag conductor 26 in circumferential registry with one of the conductors 18, full power transfer occurs through the mechanism from the input conductor 26 to the output coaxial conductor 20 associated with the particular conductor 18. As the rotor moves, however, the amount of power transferred to that particular conductor 18 diminishes and that transferred to the next succeeding conductor being approached by the conductor 26 increases at the same rate. Thus, the mechanism performs a switching or power divider function and is characterized by the fact that the input impedance reflected in the input conductor 32 remains substantially constant, so that the power flow through the switch remains substantially constant, assuming equal loads connected to the output coaxial lines 20. Obviously, in order to achieve the constant impedance effect mentioned, the circumferential spacing between the zig-zag conductors 18 and the width of zig-zag conductor configuration 24 should be predetermined by design or empirical methods. In other cases a wider spacing may be preferred, in which event there will be a progressive cutting off of power transfer from the input to the one of the outputs of the switch before any appreciable power transfer takes place from the input to the next adjacent output during progressive rotation of the switch rotor.

In the embodiment shown in FIGURE 7 a phase shifter device is provided wherein one zig-zag conductor 60 of elongated form comprising a large number of undulations cooperates with a shorter zig-zag conductor 62 of a similar zig-zag configuration. The latter is mounted by suitable guide means 61 on a track 63 to be movable longitudinally with respect to the conductor 60 while remaining in superposed energy transfer relationship therewith. As the zig-zag conductor 62 moves progressively along the conductor 60 the conditions of maximum power transfer and minimum power transfer between the conductors occur alternately due to the fact that the relative phase conditions of FIGURES 1A and 1C are alternately produced. However, the electrical phase relation between the output energy and the input energy changes progressively as this motion takes place due to the variation in electrical distance between the starting end of the zig-zag line 60 and the instantaneous position of the shorter zig-zag conductor 62. Of course, if maximum power transfer is required at each acceptable stopping point of the conductor 62, the different stopping points will be spaced from each other by definite phase increments, so that in effect the device is not a continuous phase shifter but a step-by-step phase shifter. On the other hand, if wide variations in power output are tolerable while phase shifting takes place the device may then be regarded as a continuous phase shifter.

In the switch device shown in FIGURE 8 the input zig-zag conductor 70 is mounted in the housing 72 in parallel mutually superposed relationship to the output zig-zag conductor 74. The latter is mounted on insulating supports 76 which in turn are carried by sliders 78 to which they are connected by means of the adjusting screws 80. By means of these adjusting screws the conductor 74 may be raised and lowered in relation to the conductor 70 in order to vary the spacing therebetween, whereas it may also be moved lengthwise in order to produce variable coupling coefficient. A telescoping joint 82 permits such movement of the conductor 74 coupled to a stationary conductor 86.

These and other aspects of the invention will be recognized by those skilled in the art on the basis of the foregoing disclosure of representative examples and applications of the invention.

We claim as our invention:

1. A microwave energy coupling device comprising first and second elongated line conductors of zig-zag configuration having substantially equal pitch, support means to position said line conductors in substantially parallel spaced relationship and to permit relative movement therebetween, and means to conduct microwave energy to one of said conductors and away from the other.

2. The device defined in claim 1, wherein the support means includes guide means permitting movement of one such conductor lengthwise in relation to the other.

3. The device defined in claim 1, wherein the support means includes guide means permitting movement of one such conductor transversely in relation to the other.

4. The device defined in claim 1, wherein the support means includes guide means permitting relative movement between the conductors in a direction parallel to a dimension of extent thereof.

5. The device defined in claim 1, wherein the support means includes means adjustable to vary the spacing between said conductors.

6. A microwave energy switching device, comprising first and second elongated line conductors of zig-zag configuration having substantially equal pitch, and means supporting the same in noncoplanar predetermined spatial relationship and including means to permit relative movement between said conductors.

7. A microwave energy coupling device comprising first and second elongated conductors of zig-zag configuration, means mounting said conductors in generally parallel mutually superposed relationship and adapted to permit relative movement therebetween, and means to energize one of said conductors with microwave energy and to obtain microwave energy from the other in response to, the pitch distance between successive crests on one side of one conductor being substantially equal to the distance between different crests on the corresponding side of the other conductor.

8. The coupling device defined in claim 7, wherein the mounting means includes means permitting movement of one such conductor relative to the other in the general plane of its zig-zag configuration.

9. A microwave energy coupling device comprising first and second elongated conductors of zig-zag configuration having equal pitch distances, means mounting said conductors in generally parallel mutually superposed relationship, means to energize one of said conductors with microwave energy, the pitch distance between successive crests on one side of one conductor being substantially equal to the distance between different crests on the corresponding side of the other conductor, and a third similar zig-zag conductor of the same pitch distance mounted for positioning between said first two conductors in parallel relationship therewith and movable in its body plane into and from co-phased registry therewith, thereby to interrupt and restore coupling of energy between said first two conductors.

10. A microwave energy coupling device comprising three elongated conductors of zig-zag configuration, means mounting said conductors in generally parallel mutually superposed co-phased relationship, means to energize the intermediate one of said conductors with microwave energy, the pitch distance between successive crests on one side of one conductor being substantially equal to the distance between different crests on the corresponding side of the other conductor, and fourth and fifth similar zig-zag conductors mounted in the respective spaces between the intermediate conductor and the other two conductors in parallel relationship therewith, and means mounting the fourth and fifth conductors in phase opposition and to permit lengthwise movement thereof conjointly, thereby to couple the intermediate conductor to either of the other of the first three conductors alternately by such movement.

11. The device claimed in claim 7, and a conductive means mounted adjacent the two zig-zag conductors and forming a ground plane for the coupling device.

12. A microwave energy multiposition switch device comprising stator and rotor units, one of said units including a plurality of elongated conductors of zig-zag configuration mounted with their lengths extending parallel to the rotor axis at angularly spaced positions about such one unit, extending circumferentially of such one unit, and a separate similar elongated conductor mounted on the other unit, its length extending parallel to the rotor axis and in position to move successively into and from proximate superposed registry with the first-mentioned elongated conductors by progressive rotation of the rotor unit.

13. The switch device defined in claim 12, wherein the units are coaxial and the outer of the two comprises a conductive cylindrical shell.

14. The switch device defined in claim 13, wherein the circumferential spacing between successive conductors is such that the energy transfer between one of them and the separate conductor increases substantially at the same rate as the energy transfer between an adjacent one of them and the separate conductor decreases with progressive roto rotation, whereby the total transfer impedance of said separate conductor remains approximately constant as the rotor rotates.

15. The switch device defined in claim 12, wherein the circumferential spacing between successive conductors is such that the energy transfer between one of them and the separate conductor increases substantially at the same rate as the energy transfer betwen an adjacent one of them and the separate conductor decreases with progressive rotor rotation, whereby the total transfer impedance of said separate conductor remains approximately constant as the rotor rotates.

16. A microwave phase shift device comprising a first elongated conductor of zig-zag configuration, a second elongated conductor of similar zig-zag configuration and a small fraction of the length of the first conductor, and means supporting said conductors in parallel mutually superposed positions and guiding one to permit longitudinal movement relative to the other into and through a succession of different relative phase positions of their undulations.

References Cited by the Examiner

UNITED STATES PATENTS

| | | | |
|---|---|---|---|
| 2,648,000 | 8/53 | White | 333—31 X |
| 2,794,959 | 6/57 | Fox | 333—10 |
| 2,897,459 | 7/59 | Stark | 333—31 |
| 3,005,201 | 10/61 | Rotman | 333—95 X |
| 3,020,498 | 2/62 | Ash et al. | 333—13 |
| 3,050,657 | 8/62 | Branch | 333—31 X |
| 3,054,017 | 9/62 | Putz | 333—31 X |
| 3,105,207 | 9/63 | Capewell | 333—10 |

HERMAN KARL SAALBACH, *Primary Examiner.*

UNITED STATES PATENT OFFICE

CERTIFICATE OF CORRECTION

Patent No. 3,167,727 January 26, 1965

Clarence D. Lunden et al.

It is hereby certified that error appears in the above numbered patent requiring correction and that the said Letters Patent should read as corrected below.

Column 7, line 9, for "other in response to" read -- other in response thereto --.

Signed and sealed this 22nd day of June 1965.

(SEAL)
Attest:

ERNEST W. SWIDER
Attesting Officer

EDWARD J. BRENNER
Commissioner of Patents